(12) United States Patent
Ramakrishnan et al.

(10) Patent No.: US 12,063,502 B2
(45) Date of Patent: Aug. 13, 2024

(54) SYSTEMS AND METHODS FOR PKI CERTIFICATE AND KEY ALLOCATIONS TO WIRELESS BASE STATION RADIO UNITS

(71) Applicant: CommScope Technologies LLC, Hickory, NC (US)

(72) Inventors: Shanthakumar Ramakrishnan, Westford, MA (US); Prashanth Venkatesh, Bangalore (IN); Tat Keung Chan, San Diego, CA (US); Devaraj Sambandan, Bengaluru (IN)

(73) Assignee: CommScope Technologies LLC, Claremont, NC (US)

( * ) Notice: Subject to any disclaimer, the term of this patent is extended or adjusted under 35 U.S.C. 154(b) by 227 days.

(21) Appl. No.: 17/855,229

(22) Filed: Jun. 30, 2022

(65) Prior Publication Data

US 2023/0007479 A1    Jan. 5, 2023

(30) Foreign Application Priority Data

Jul. 2, 2021 (IN) .............................. 202141029811

(51) Int. Cl.
*H04L 9/00* (2022.01)
*H04L 9/32* (2006.01)
(Continued)

(52) U.S. Cl.
CPC ..... *H04W 12/068* (2021.01); *H04W 12/0431* (2021.01); *H04W 12/069* (2021.01); *H04W 12/61* (2021.01)

(58) Field of Classification Search
CPC ........... H04W 12/068; H04W 12/0431; H04W 12/069; H04W 12/61; H04L 9/006; H04L 9/3247; H04L 9/3263; H04L 2463/062
See application file for complete search history.

(56) References Cited

U.S. PATENT DOCUMENTS

| | | | |
|---|---|---|---|
| 10,205,740 B2 * | 2/2019 | Stirtzinger | H04L 63/1408 |
| 2020/0092901 A1 * | 3/2020 | Barabell | H04B 17/318 |
| 2021/0152545 A1 * | 5/2021 | Park | H04L 9/3268 |

FOREIGN PATENT DOCUMENTS

KR    1020190102432 A    9/2019

OTHER PUBLICATIONS

5G Americas, 'Security considerations for the 5G Era', 3GPP, White Paper, Jun. 2020, as downloaded by WIPO on Sep. 25, 2022, Page(s) Cover through 52.
(Continued)

*Primary Examiner* — Joseph P Hirl
*Assistant Examiner* — Aayush Aryal
(74) *Attorney, Agent, or Firm* — Fogg & Powers LLC

(57) ABSTRACT

Systems and methods for PKI certificate and key allocations to wireless base station radio units are provided. In one embodiment, a system for obtaining PKI credentials for a remote unit for a wireless base station, the system comprises: a remote unit, the remote unit configured to implement a radio frequency (RF) interface; a gateway coupled to the remote unit, the gateway communicatively coupled to an online provision service (OPS) certificate authority (CA); wherein the gateway is configured to generate an AuthToken unique to the remote unit, wherein the remote unit is configured to request a RU digital certificate and private key from an OPS CA based on the AuthToken.

27 Claims, 9 Drawing Sheets

(51) Int. Cl.
*H04W 12/0431* (2021.01)
*H04W 12/06* (2021.01)
*H04W 12/069* (2021.01)
*H04W 12/61* (2021.01)

(56) References Cited

OTHER PUBLICATIONS

International Searching Authority, "International Search Report and Written Opinion from PCT Application No. PCT/US2022/035814 dated Oct. 26, 2022", from Foreign Counterpart to U.S. Appl. No. 17/855,229, pp. 1 through 9, Published in: KR.

* cited by examiner

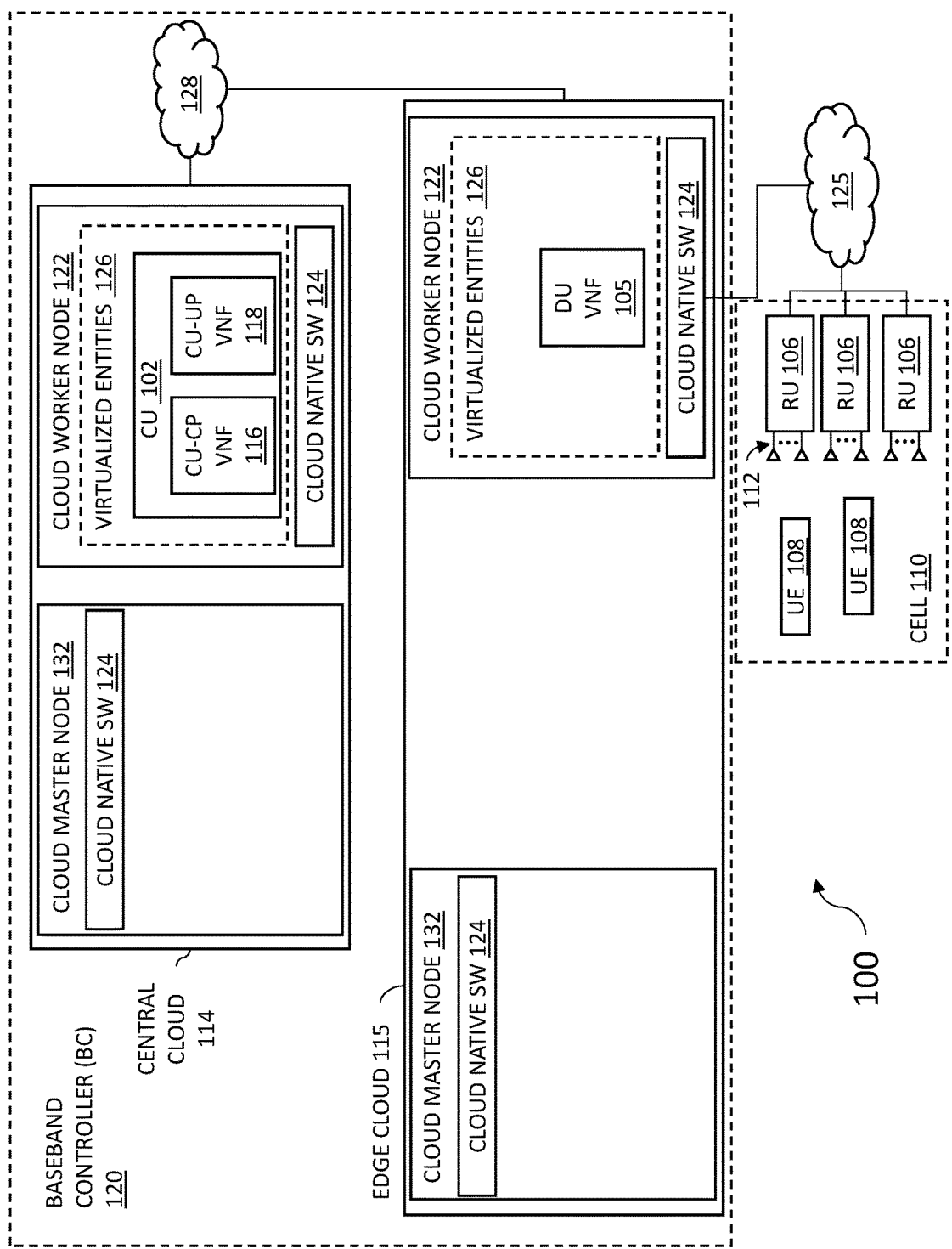

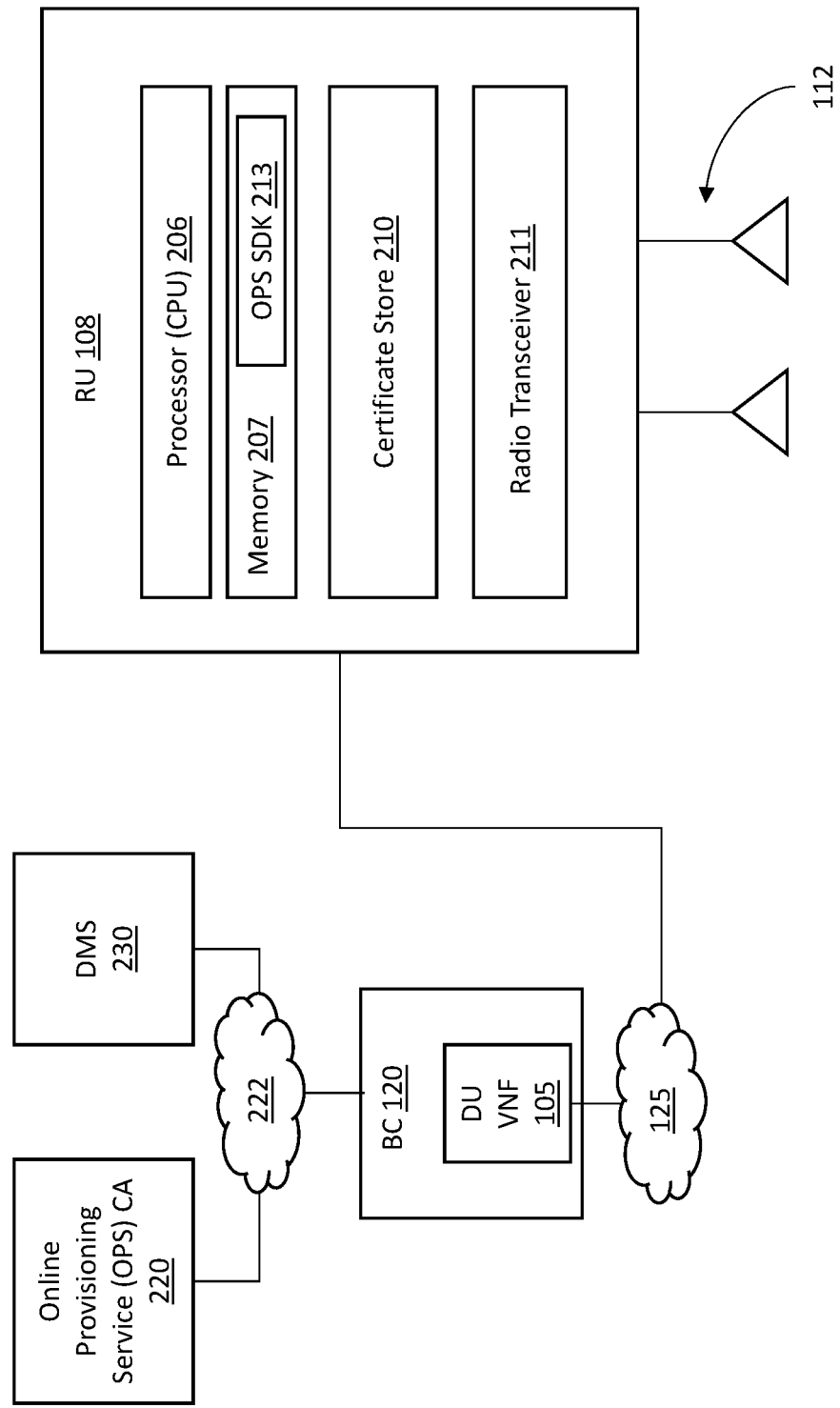

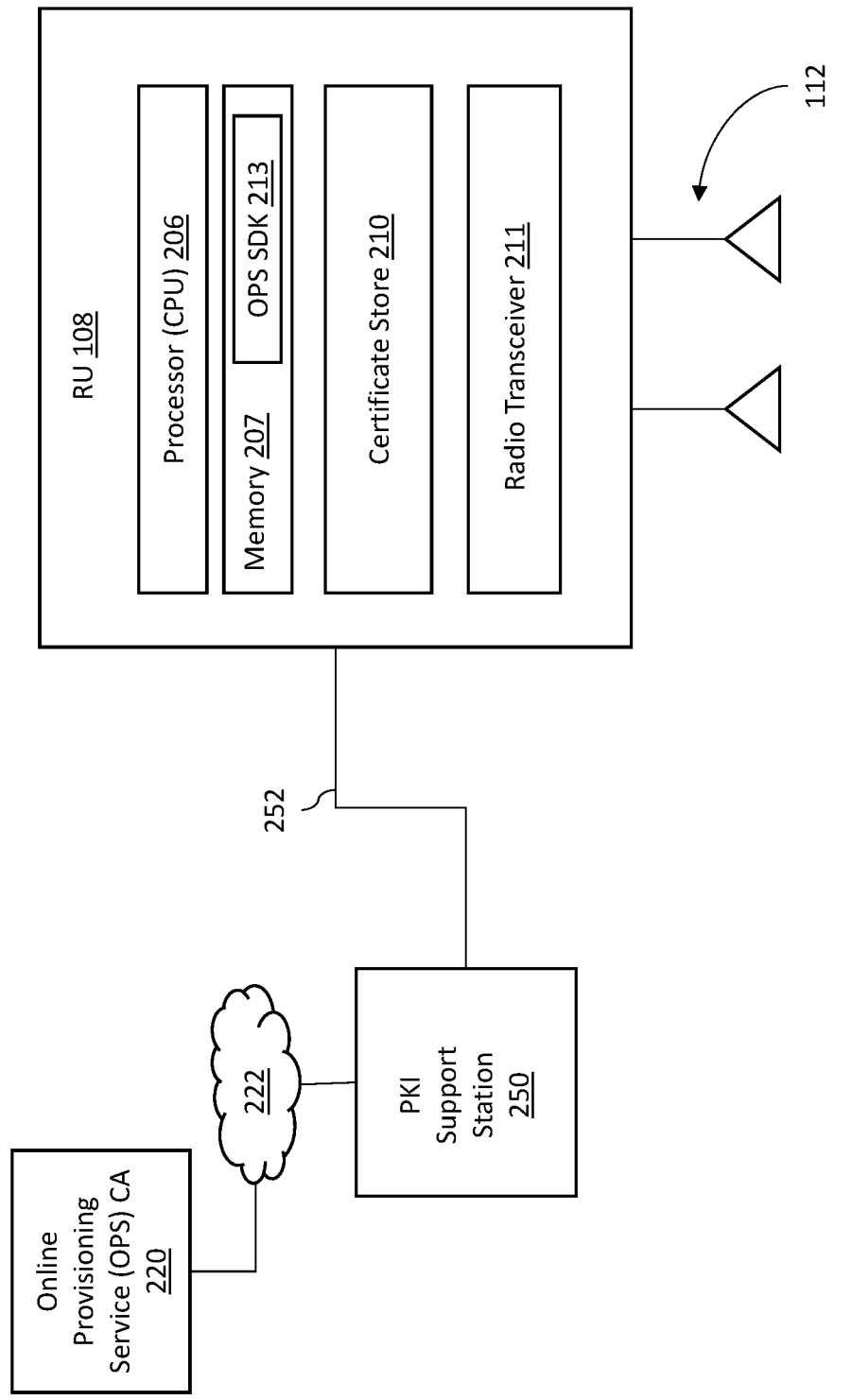

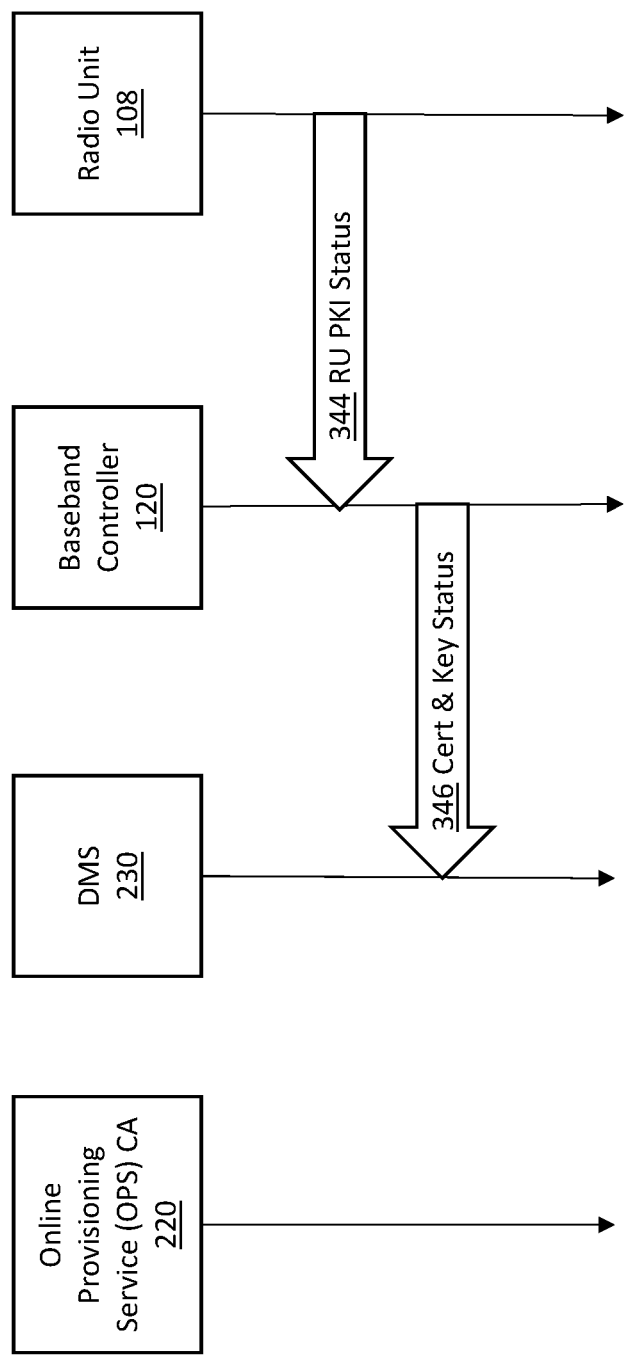

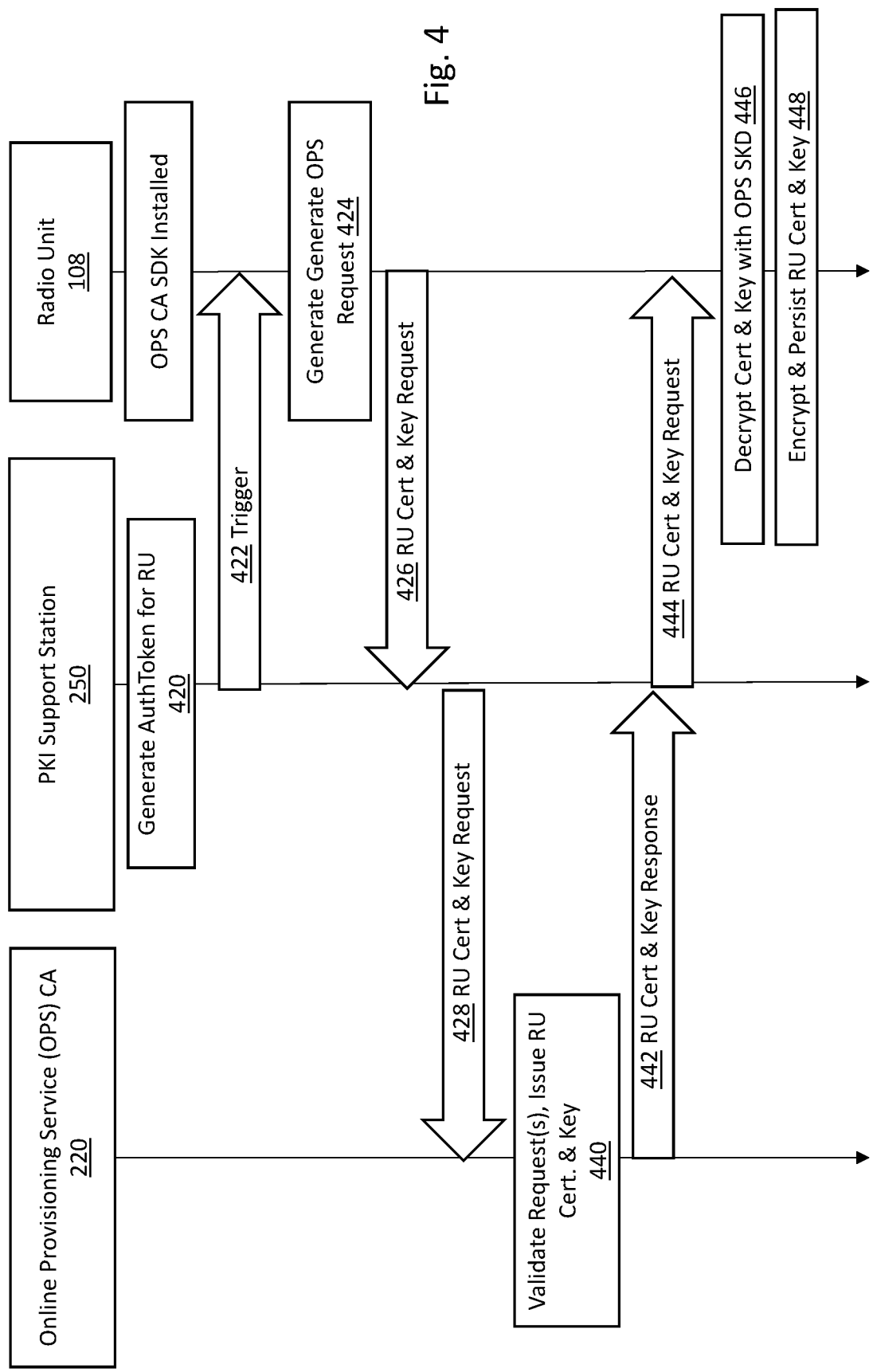

SYSTEMS AND METHODS FOR PKI CERTIFICATE AND KEY ALLOCATIONS TO WIRELESS BASE STATION RADIO UNITS

CROSS-REFERENCE TO RELATED APPLICATIONS

This application claims the benefit of Indian Provisional Patent Application No. 202141029811 filed on Jul. 2, 2021, entitled "SYSTEMS AND METHODS FOR PKI CERTIFICATE AND KEY ALLOCATIONS TO WIRELESS BASE STATION RADIO UNITS", the entirety of which is incorporated herein by reference.

BACKGROUND

Cloud-based virtualization of Fifth Generation (5G) base stations (also referred to as "gNodeBs" or "gNBs") is widely promoted by standards organizations, wireless network operators, and wireless equipment vendors. Such an approach can help provide better high-availability and scalability solutions as well as addressing other issues in the network.

SUMMARY

The present disclosure provides systems and methods for digital certificate and private key allocations to wireless base station radio units and will be understood by reading and studying the following specification.

Systems and methods for public key infrastructure (PKI) certificate and key allocations to wireless base station radio units are provided. In one configuration, a system for obtaining PKI credentials for a remote unit for a wireless base station, the system includes at least: a remote unit, the remote unit configured to implement a radio frequency (RF) interface; a gateway coupled to the remote unit, the gateway communicatively coupled to an online provision service (OPS) certificate authority (CA); wherein the gateway is configured to generate an AuthToken unique to the remote unit, wherein the remote unit is configured to request a RU digital certificate and private key from an OPS CA based on the AuthToken.

In another configuration, a method is provided for a remote unit (RU) of a wireless base station for obtaining PKI credentials. The method includes sending a PKI status message to a controller of the base station. The PKI status message indicates that an RU digital certificate and private key are missing from a certificate store of the remote unit; receiving an AuthToken from the controller. The AuthToken includes a time stamp and a media access control (MAC) address for the remote unit. The AuthToken is signed using a signing key by the controller. The method also includes generating an RU digital certificate and private key request message by signing the AuthToken with a global key; transmitting the RU digital certificate and private key request message to the controller for forwarding to an online provision service (OPS) certificate authority (CA). The method also includes receiving an RU digital certificate and private key response message from the controller. The RU digital certificate and private key response message include an RU digital certificate and private key from the OPS CA. The method also includes decrypting the private key from the RU digital certificate and private key response message and storing the RU digital certificate and private key in the certificate store.

In another configuration, a method for a wireless base station for obtaining PKI credentials for a remote unit of the wireless base station. The method includes receiving a PKI status message at a controller of the base station. The PKI status message indicates that an RU digital certificate and private key are missing from a certificate store of a remote unit. The method also includes sending an enable request message to a device management system (DMS) for the wireless base station, the enable request message identifying the remote unit as missing the RU digital certificate and private key. The method also includes receiving an enable response message from the DMS, the enable response message indicated whether the remote is authorized to receive an RU digital certificate and private key; when the remote is authorized to receive an RU digital certificate and private key, generating and sending to the remote unit an AuthToken including a time stamp and a media access control (MAC) address for the remote unit. The AuthToken is signed with a signing key of controller. The method also includes receiving an RU digital certificate and private key request message from the remote unit, the RU digital certificate and private key request message including the AuthToken and signed by the remote unit with a global key; forwarding the RU digital certificate and private key request message to an online providing service (OPS) certificate authority (CA) for the wireless base station. The method also includes forwarding an RU digital certificate and private key response message from the OPS CA to the remote unit.

In another configuration, a method for a remote unit (RU) for a wireless base station for obtaining PKI credentials. The method includes coupling a remote unit for a wireless base station to a PKI support station. The remote unit includes a certificate store that is missing an RU digital certificate and private key for the remote unit. The method also includes receiving a trigger message from the PKI support station. The trigger message includes an AuthToken that includes a time stamp and a media access control (MAC) address for the remote unit. The AuthToken is signed using a signing key by the PKI support station. The method also includes generating an RU digital certificate and private key request message by signing the AuthToken with a global key; transmitting the RU digital certificate and private key request message to the PKI support station for forwarding to an online provision service (OPS) certificate authority (CA). The method also includes receiving an RU digital certificate and private key response message from the PKI support station, the RU digital certificate and private key response message includes an RU digital certificate and private key from the OPS CA. The method also includes decrypting the private key from the RU digital certificate and private key response message and storing the RU digital certificate and private key in the certificate store.

In another configuration, a method for obtaining PKI credentials for a remote unit for a wireless base station utilizing a PKI support station. The method includes coupling a remote unit for a wireless base station to THE PKI support station. The remote unit includes a certificate store that is missing an RU digital certificate and private key for the remote unit. The method also includes sending a trigger message from the PKI support station to the remote unit, the trigger message including an AuthToken that includes a time stamp and a media access control (MAC) address for the remote unit. The AuthToken is signed using a signing key by the PKI support station. The method also includes receiving an RU digital certificate and private key request message from the remote unit, the RU digital certificate and private key request message including the AuthToken and signed by the remote unit with a global key. The method also includes forwarding the RU digital certificate and private key request message to an online providing service (OPS) certificate authority (CA) for the wireless base station; and forwarding an RU digital certificate and private key response message from the OPS CA to the remote unit.

DRAWINGS

Embodiments of the present disclosure can be more easily understood and further advantages and uses thereof more readily apparent, when considered in view of the description of the preferred embodiments and the following FIGURES in which:

FIGS. 1 and 1A are diagrams illustrating an example wireless base station embodiment.

FIGS. 2 and 2A are diagrams illustrating digital certificate and private key allocations for wireless base station radio units.

FIG. 3A-3C are message flow diagrams illustrating digital certificate and private key allocations for a field deployed wireless base station radio unit.

FIG. 4 is message flow diagram illustrating digital certificate and private key allocations for a wireless base station radio unit prior to deployment.

In accordance with common practice, the various described features are not drawn to scale but are drawn to emphasize features relevant to the present disclosure. Reference characters denote like elements throughout FIGURES and text.

DETAILED DESCRIPTION

Figure 1A:
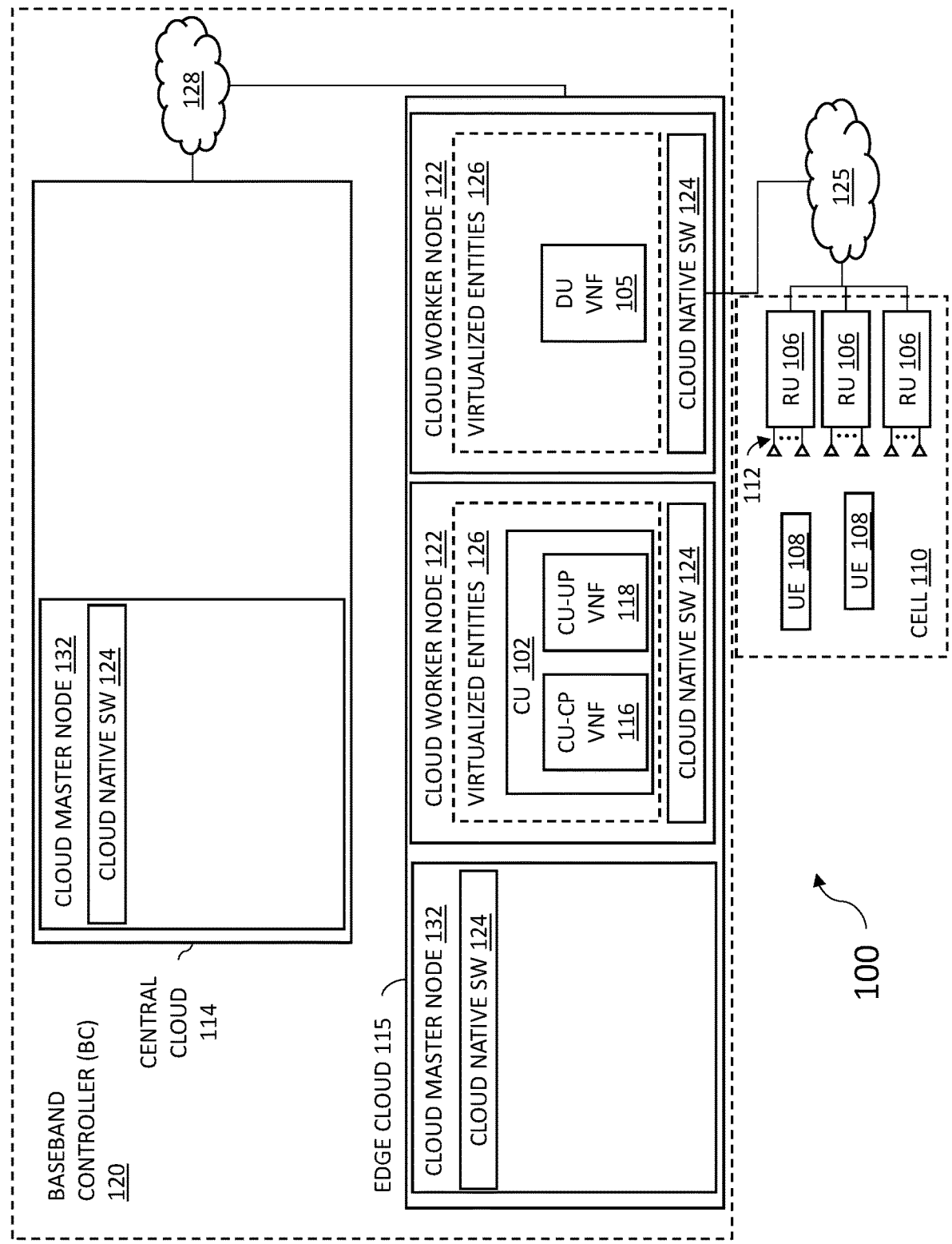

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

In general, a distributed 5G gNodeB can be partitioned into different entities, each of which can be implemented in different ways. For example, each entity can be implemented as a physical network function (PNF) or a virtual network function (VNF) and in different locations within an operator's network (for example, in the operator's "edge cloud" or "central cloud"). A distributed 5G gNodeB can be partitioned into one or more central units (CUs), one or more distributed units (DUs), and one or more radio units (RUs). The CU and DUs together are referred to as a baseband controller (BC). Each CU can be further partitioned into a central unit control-plane (CU-CP) and one or more central unit user-plane (CU-UPs) dealing with the gNodeB Packet Data Convergence Protocol (PDCP) and above layers of functions of the respective planes, and each DU configured to implement the upper part of physical layer through radio link control (RLC) layer of both control-plane and user-plane of gNodeB. In this example, each RU is configured to implement the radio frequency (RF) interface and lower physical layer control-plane and user-plane functions of the gNodeB. Each RU is typically implemented as a physical network function (PNF) and is deployed in a physical location where radio coverage is to be provided. Each DU is typically implemented as a virtual network function (VNF) and, as the name implies, is typically distributed and deployed in a distributed manner in the operator's edge cloud. Each CU-CP and CU-UP are typically implemented as virtual network functions (VFs) and, as the name implies, are typically centralized and deployed in the operator's central cloud.

Cloudification and virtualization of network elements for a 5G gNodeB brings in a lot of benefits also impose more and more challenges to the security solutions that protect the VNF hosting platform from being compromised by unauthenticated booting modules and unauthorized applications. For radio units to operate in 5G NR, they need to support authentication and security using public key infrastructure (PKI) certificates & keys in order to establish secured communications with a DU over a management plane (M-plane). This is a departure from the legacy approach of LTE where the DU and RU utilizes a pre-shared key installed at the factory as security. As such, a challenge is presented in how to securely install a unique set of digital certificate and private key in newly fabricated RUs from the recognized certificate authority (CA). Moreover, an already-deployed RU may be capable of supporting multiple carriers that may include a mix of 4G LTE and 5G carriers. These deployed RUs are installed in the field as part of operating wireless base stations, and do not have access to the Internet to be able to retrieve for themselves their digital certificate and private key to operate in 5G. Accordingly, another challenge is presented in how to securely install a unique set of digital certificate and private key in newly fabricated RUs from the recognized certificate authority (CA) into these deployed RUs.

Embodiments of the present disclosure provide systems and methods for securely providing unique digital certificate and private key allocations to a wireless base station radio units. The end-to-end approach described herein securely delivers the desired credentials to multi-band radio units whether they are newly fabricated, or already deployed.

FIGS. 1 and 1A are block diagrams illustrating examples of a virtualized wireless base station 100 on a VNF hosting platform on which the radio units described herein may be utilized. In the context of a fourth generation (4G) Long Term Evolution (LTE) system, a base station 100 may also be referred to as an "evolved NodeB" or "eNodeB", and in the context of a fifth generation (5G) New Radio (NR) system, may also be referred to as a "gNodeB." Base station 100 may be referred to as something else in the context of other wireless interfaces. Moreover, the radio units (RUs) discussed herein may alternately be described in different implementations as radio points (RPs) or remote antenna units (RAUs).

In the particular examples shown in FIGS. 1 and 1A, the virtualized wireless base station 100 comprises a 5G gNodeB 100 partitioned into one or more central units (CUs) 102, which include a central unit control-plane (CU-CP) 116 and one or more central unit user-planes (CU-UPs) 118. In this example, the CU-CP 116 and CU-UPs 118 are both implemented as VNFs, but may be implemented in other ways in other implementations. The gNodeB 100 is further partition into one or more distributed units (DUs) and one or more radio units (RUs) 106. In this example, the DUs 105 are composed of one or more DU VNFs 105, but may be implemented in other ways in other implementations.

In this example the virtualized 5G gNodeB 100 is configured so that each CU 102 is configured to serve one or more DU VNF 105 and each DU VNF 105 is configured to serve one or more RUs 106. In the particular configuration shown in FIGS. 1 and 1A, a single CU 102 serves a single DU VNF 105, and the DU VNF 105 serves three RUs 106. However, the particular configurations shown in FIGS. 1 and 1A are only examples. In other embodiments, other numbers of CUs 102, DUs 104, and RUs 106 can be used. Also, the number of DUs 104 served by each CU 102 can vary from CU 102 to CU 102. Likewise, the number of RUs 106 served by each DU can vary from DU VNF 105 to DU VNF 105.

Moreover, although the following embodiments are primarily described as being implemented for use to provide 5G NR service, it is to be understood the techniques described here can be used with other wireless interfaces (for example, fourth generation (4G) Long-Term Evolution (LTE) service) and references to "gNodeB" used in this disclosure can be replaced with the more general term "base station" or "base station entity" and/or a term particular to the alternative wireless interfaces (for example, "enhanced NodeB" or "eNB"). Furthermore, it is also to be understood that 5G NR embodiments can be used in both standalone and non-standalone modes (or other modes developed in the future) and the following description is not intended to be limited to any particular mode. Also, unless explicitly indicated to the contrary, references to "layers" or a "layer" (for example, Layer 1, Layer 2, Layer 3, the Physical Layer, the MAC Layer, etc.) set forth herein refer to layers of the wireless interface (for example, 5G NR or 4G LTE) used for wireless communication between a base station and user equipment.

In some configurations, every RU 106 serves the same cell(s) 110. Generally, for each cell 110 implemented by the gNodeB 100, the corresponding BC 120 serving the cell 110 performs the LAYER-3 and LAYER-2 functions for the particular wireless interface used for that cell 110. Also, for each cell 110 implemented by the C-RAN 200, the corresponding BC 120 serving the cell 110 performs some of the LAYER-1 functions for the particular wireless interface used for that cell 110 (also referred to here as the "upper LAYER-1 functions"). Each of the RUs 106 serving that cell 110 perform the LAYER-1 functions not performed by the BC 120 (also referred to here as the "lower LAYER-1 functions") as well as implementing the analog RF transceiver functions.

Different splits in the wireless-interface functions between each BC 120 and the RUs 106 can be used. For example, the functional split used for downlink communications (that is, communications transmitted to the UEs 108) can differ from the functional split used for uplink communications (that is, communications received from the UEs 108). Also, for a given direction (downlink or uplink), the same functional split does not need to be used for all fronthaul data communicated in that direction. For example, different functional splits can be used for different channels or different resource blocks.

In some configurations, each RU 106 comprises one or more radio frequency (RF) modules. Each RF module comprises special-purpose hardware (circuitry) that implements the RF transceiver functions for the wireless interface used for communicating with the UEs 108 using a particular carrier. Each RF modules also interfaces an RU module (and the RU 106) to the one or more antennas 112 used with that particular carrier.

In some configurations, each RU 106 is implemented using special-purpose hardware that comprises a multi-core general purpose processor and programmable logic (such as a field-programmable gate array (FPGA)). In some configurations, each RU 106 implements some of the lower LAYER-1 functions for the particular wireless interfaces used for communicating with UEs 108. The lower LAYER-1 functions, in some configurations, are implemented using the programmable logic in the RU 106. Also, in some configurations, each RU 106 implements a timing client to synchronize its clock to the master clock for the gNodeB 100. The timing client, in some configurations, is implemented in software executed by the general-purpose processor in the RU 106.

In some configurations, at least some of the RUs 106 are implemented as multi-carrier radio points. The gNodeB 100 can be implemented using only single-carrier radio points, only multi-carrier radio points, or both single-carrier radio points and multi-carrier radio points. Also, any given cell 110 can be served by only single-carrier radio points, only multi-carrier radio points, or both single-carrier radio points and multi-carrier radio points.

When an RU 106 optionally serves multiple cells 110 using multiple carriers, it may do so by implementing different RU instances (e.g., modules). For example, an RU 106 could use a different RU instance for each carrier the RU 106 implements. In some examples, each RU instance within an RU 106 may be implemented as an independent digital instance (e.g., a processing core) on one or more programmable processors in a multi-instance RU 106 within a single physical housing, e.g., where each programmable processor is a field programmable gate array (FPGA), an application specific integrated circuit (ASIC), a microprocessor, or a digital signal processor (DSP). Each multi-instance RU 106, may optionally have multiple ETHERNET ports, each being assigned to a different RU instance (though all RU instances in a multi-instance RU may optionally share the same IP address).

Each multi-carrier radio point may optionally include multiple RF modules and be configured to serve multiple cells 110 using multiple carriers, possibly using multiple wireless interfaces or protocols, in a flexible and dynamic manner. Typically, each multi-carrier radio point is homed to a separate BC 120 for each cell 110 that it serves (and each carrier used to serve that cell 110).

In general, the virtualized gNodeB 100 is configured to provide wireless service to various numbers of user equipment (UEs) 108 using one or more cells 110 (only one of which is shown in FIGS. 1 and 1A for ease of illustration). Each RU 106 includes or is coupled to a respective set of one or more antennas 112 via which downlink RF signals are radiated to UEs 108 and via which uplink RF signals transmitted by UEs 108 are received.

In one configuration (used, for example, in indoor deployments), each RU 106 is co-located with its respective set of antennas 112 and is remotely located from the DU VNF 105 and CU 102 serving it as well as the other RUs 106. In another configuration (used, for example, in outdoor deployments), the respective sets of antennas 112 for multiple RUs 106 are deployed together in a sectorized configuration (for example, mounted at the top of a tower or mast), with each set of antennas 112 serving a different sector. In such a sectorized configuration, the RUs 106 need not be co-located with the respective sets of antennas 112 and, for example, can be co-located together (for example, at the base of the tower or mast structure) and, possibly, co-located with its serving DUs 104. Other configurations can be used.

The virtualized gNodeB 100 is implemented using a scalable cloud environment to define a baseband controller (BC) 120 in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The BC 120 can be implemented in various ways.

For example, the BC 120 can be implemented using hardware virtualization, operating system virtualization, and application virtualization (also referred to as containerization) as well as various combinations of two or more of the preceding. The BC 120 can be implemented in other ways. For example, as shown in FIGS. 1 and 1A, the BC 120 is implemented in a distributed manner. That is, the BC 120 is implemented as a distributed scalable cloud environment 120 comprising at least one central cloud 114 and at least one edge cloud 115.

When a function is described herein as being implemented using a virtualized platform, that function could be implemented in software suitable for execution by a virtual machine instantiated on a generic server or an accelerated server. A "generic server" refers to a general-purpose server computer (for example, a server computer based on the INTEL x86 platform) that does not include any hardware acceleration units. An "accelerated server" refers to a general-purpose server computer that includes one or more hardware acceleration units (for example, one of more FPGAs). When instantiated on an accelerated server, the software can make use of hardware acceleration provided by the hardware acceleration units in the accelerated server.

In the examples shown in FIGS. 1 and 1A, each RU 106 is implemented as a physical network function (PNF) comprising radio transceiver circuitry and is deployed in or near a physical location where radio coverage is to be provided. In this example, each DU is implemented with one or more DU virtual network functions (VNFs) 105 and may be distributed and deployed in a distributed manner in the edge cloud 115. Each CU-CP 116 and CU-UP 118 is implemented as a virtual network function (VNF). The CU-CP 116 and CU-UP 118 may be centralized and deployed in the central cloud 114 as shown in FIG. 1. FIG. 1A illustrates an alternative implementation to FIG. 1 where the CU-CP 116 and CU-UP 118 are instead deployed in the edge cloud 115. In the examples shown in these FIGS. 1 and 1A, the CU 102 (including the CU-CP VNF 116 and CU-UP VNF 118) and the entities used to implement it are communicatively coupled to each DU VNF 105 served by the CU 102 (and the DU VNF(s) 105 used to implement each such DU). In some embodiments, the CU 102 and DU 105 are communicatively coupled over a midhaul network 128 (for example, a network that supports the Internet Protocol (IP)). In the examples shown in FIGS. 1 and 1A, each the DU VNF(s) 105 used to implement a DU are communicatively coupled to each RU 106 served by the DU VNF 105 using a fronthaul network 125 (for example, a switched Ethernet network that supports the IP).

The scalable cloud environment utilized for BC 120 comprises one or more cloud worker nodes 122 that are configured to execute cloud native software 124 that, in turn, is configured to instantiate, delete, communicate with, and manage one or more virtualized entities 126 of a base station (for example, a CU-CP VNF 116, CU-UP VNF 118 and DU VNF 105 for a gNodeB). The cloud worker nodes 122 may comprise respective clusters of physical worker nodes (or virtualized worker nodes if implemented in combination with hardware virtualization), the cloud native software 124 may comprise a shared host operating system, and the virtualized entities 126 comprise containers. In another example, the cloud worker nodes 122 comprise respective clusters of physical worker nodes, the cloud native software 124 comprises a hypervisor (or similar software), and the virtualized entities 126 comprise virtual machines. Additionally, the BC 120 may be coupled to a core network (not shown in FIG. 1) of the associated wireless network operator(s) over an appropriate back-haul network.

In the example shown in FIGS. 1 and 1A, the scalable cloud environment for BC 120 includes a cloud "master" node 130. There are certain responsibilities that the cloud "master" node 130 has as far as instantiation of cloud worker nodes 122 and clustering them together. The cloud master node 130 is configured to implement management and control plane processes for the worker nodes 122 in a cluster. In some examples, the cloud master node 130 is configured to determine what runs on each of the cloud worker nodes 122, which can include scheduling, resource allocation, state maintenance, and monitoring. In some examples, the cloud master node is configured to manage the lifecycle, scaling, and upgrades of workloads (such as containerized applications) on the cloud worker nodes 122.

Each of the virtual network functions, DU VNF 105, CU-CP VNF 116, and CU-UP VNF 118 is implemented as a software virtualized entity 226 that is executed in the scalable cloud environment 120 on a cloud worker node 122 under the control of the cloud native software 124 executing on that cloud worker node 122. In the following description, a cloud worker node 122 that implements at least a part of a CU 102 (for example, a CU-CP VNF 116 and/or a CU-UP VNF 118) is also referred to here as a "CU cloud worker node" 122, and a cloud worker node 122 that implements at least a part of a DU VNF 105 is also referred to here as a "DU cloud worker node" 122.

In the example embodiment of a gNodeB 100 base station, the CU-CP VNF 116 and the CU-UP VNF 118 are each implemented as a respective virtualized entity 126 executing on the same cloud worker node 122. The DU VNF 105 may be implemented as a virtualized entity 126 executing on the same cloud worker node 122 or a different cloud worker node 122. In other configurations and examples, the CU 102 can be implemented using multiple CU-UP VNFs 118 using multiple virtualized entities 126 executing on one or more cloud worker nodes 122. In another example, multiple DU VNFs 105 (using multiple virtualized entities 126 executing on one or more cloud worker nodes 122) can be used to serve a cell, where each of the multiple DU VNFs 105 serves a different set of RUs 106. Moreover, it is to be understood that the CU 102 and DU VNF 105 can be implemented in the same cloud (for example, together in an edge cloud 215). Other configurations and examples can be implemented in other ways. The various VNFs are configured to be activated to make them service ready using for example, service configurations with an Operations and Maintenance (OAM) entity or Device Management System (DMS).

FIG. 2 illustrates an RU 108 that comprises a processor 206 (i.e., a central processing unit (CPU)) and a memory 207 which together store and execute code to realize aspects of the RU 108 in operation as discussed herein. The memory 207 also stores an online provisioning service (OPS) software development kit (SDK) 213 that includes code for obtaining the certificate and private key from an OPS CA 220 as discussed in greater detail below. The RU 108 comprises certificate store 210 within which the RU 108 stores the digital certificate and private key that it receives from the OPS CA 220, and radio transceiver circuitry 211 which includes uplink and downlink paths that comprise amplifiers, filters, and other transceiver electronics. Accordingly, the radio transceiver circuitry 211 is coupled to the one or more antenna 112 of the RU 108.

FIG. 2 specifically illustrates the example of an RU 108 that is deployed and coupled to the RU VNF 105 of BC 120 via fronthaul network 125. The BC 120 is communicatively coupled to the OPS CA 220 and a DMS 230 via a network 222. The network 222 may comprise a public network such as the Internet, a proprietary network, or a combination thereof.

FIG. 2A illustrates an alternative example where a newly fabricated RU 108 that is not yet deployed but is instead coupled to a PKI support station 250 via a wired or wireless communication link 252. For example, the PKI support station 250 may comprise equipment installed in a manufacturing facility where a newly fabricated RU 108 is taken to obtain its digital certificate and private key, and where other diagnostics and software installation may optionally also be performed.

Both processes for either approach are similar and share the principle that the entity that requires the digital certificate and private key should be the entity where the digital certificate and private key request should originate.

Figure 3A:
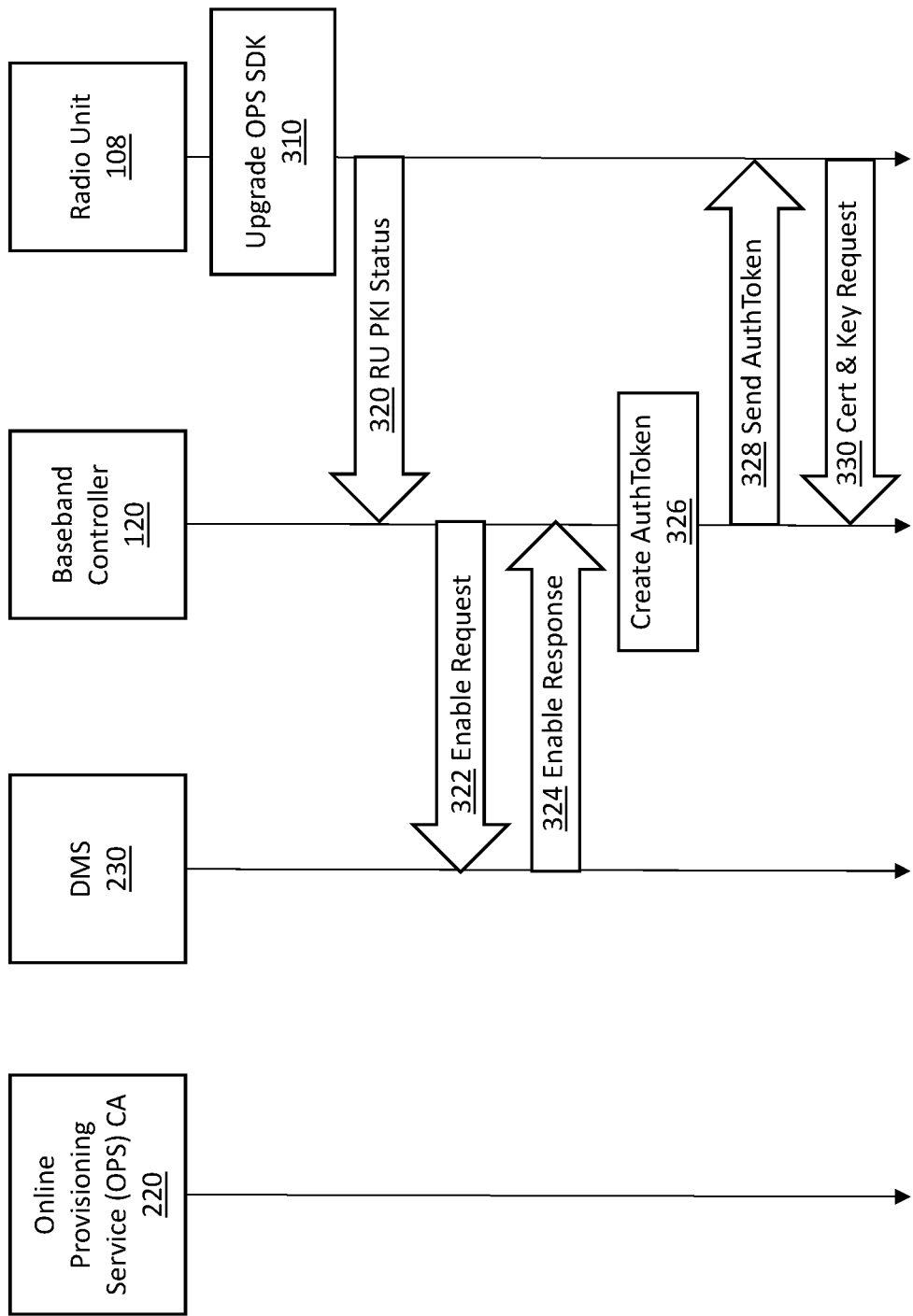
Figure 3B:
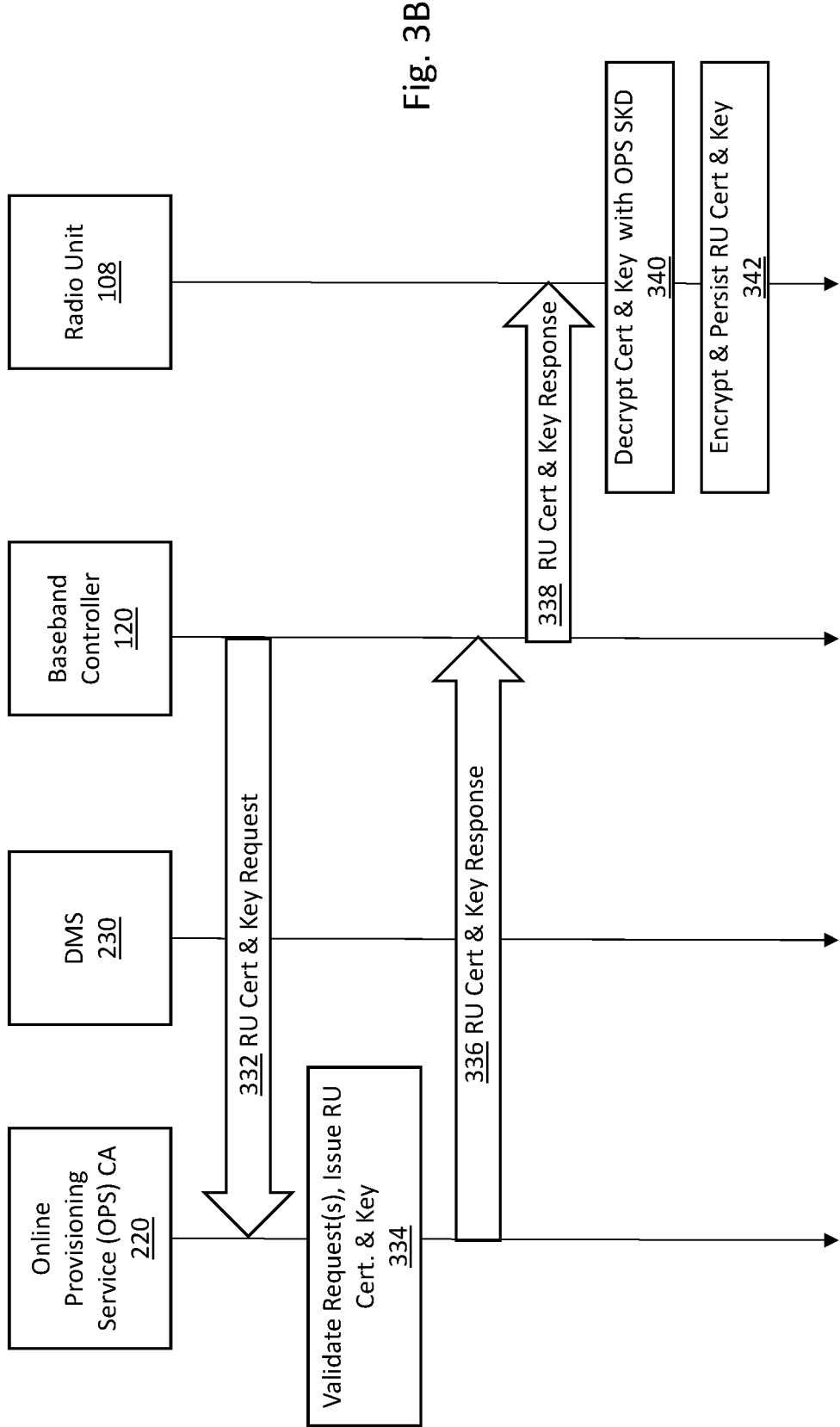

FIGS. 3A-3C illustrate a process sequence for the approach illustrated in FIG. 2 for field deployed radio units 108. Each BC 120 can connect to one, or many RUs 108. For example, some BC 120 can connect to up to 128 RUs 108. In these FIG. 3A-3C, the deployed RU 108 is in operation utilizing multiple carrier channels, but has the capacity for at least one more set of channels for a carrier where a digital certificate and private key are utilized, such a with 5G. Because the BC 120 and RU 108 are both in operation, there is already secure communications established between the BC 120 and RU 108. Moreover, the RU 108 has been updated (shown at 310) to include the OPS SDK 213 and the RU M-Plane functions that include the code for establishing and operating M-plane communication with the DU VNF 105 utilizing the RU's digital certificate and private key (once received from the OPS CA 220). In some embodiments, the RU 108 comprises RU application code that supports M-plane Network Configuration Protocol (NETCONF) communication.

Once the OPS SDK 213 is uploaded and executed by the processor 206, the RU 108 has the ability to talk with the DU VNF 105 via the M-plane. The OPS SDK 213 will make an initial query to the certificate store 210 and determine that it lacks an RU set of digital certificate and private key. In response, the OPS SDK 213 sends an RU PKI status message 320 to inform the BC 120 its RU digital certificate and private key are missing.

When the BC 120 receives the RU PKI status message 320 it will determine whether the RU 108 should receive a RU digital certificate and private key. That is, the network operator may determine that for the BC 120, one or more of the currently deployed RUs 108 will not support the upgraded wireless service. For example, the network operator has elected to deploy 5G NR to some coverage areas, but not others. The BC 120 therefore sends to the DMS 230 an enable request message 322 indicating the RU 108 with the missing RU digital certificate and private key. The DMS 230, being the management system for the wireless network, knows which BCs and RUs will be supporting the upgraded wireless service and responds to the BC 120 with an enable response message 324 that tells the BC 120 whether the RU 108 is authorized to receive an RU digital certificate and private key. If the RU 108 indicates by the RU PKI status message 320 that is does not possess an RU digital certificate and private key, but the enable response message 324 indicates that the RU 108 is authorized by the DMS 230 to enable the upgraded wireless service, then the BC 120 will initiate the process to that RU 108 can obtain an RU digital certificate and private key from the OPS CA 220. More specifically, the BC 120 will respond at 326 by generating an AuthToken comprising a time stamp and the media access control (MAC) address for the RU 108 (referred to herein as the RU-MAC) and sign the AuthToken with its BC private key. The BC private key is a unique private key issued by the OPS CA 2200 to the BC 120, that the BC 120 uses to sign AuthTokens. The BC 120 send an AuthToken message 328 with the signed AuthToken to the RU 108. The OPS SDK 213 has embedded within an obfuscated global key that it utilizes in combination with the signed AuthToken to arrive at a unique signature for the RU 108. The RU 108 generates an RU digital certificate and private key request message 330 by signing the AuthToken using its global key and RU-MAC and sends the RU digital certificate and private key request message 330 to the BC 120, which can communicate with the OPS CA 220 via the network 222.

Referring next to FIG. 3B, upon receiving the RU digital certificate and private key request message 330, it forwards the RU digital certificate and private key request to the OPS CA 220 as RU digital certificate and private key request message 332. Here, OPS CA 220 at 334 validates the signature of the received RU digital certificate and private key request message 332. The OPS CA 220 may further verify the uniqueness of the RU digital certificate and private key request, meaning that no RU other than the RU 108 would have generated that request. Once validated, the OPS CA 220 issues an RU digital certificate and private key that is unique to the requesting RU 108. The digital certificate may be in the form of an X.509 format certificate, or other form.

The OPS CA 220 output to the BC 120 an RU digital certificate and private key response message 336. The BC 120 response by forwarding RU digital certificate and private key response message 338 with the with the RU digital certificate and private key to the RU 108. At the RU 108, the RU digital certificate and private key response message 338 is verified, and the private key is decrypted (shown at 340) by the OPS SDK 213. It should be understood that when a certificate and private key set are discussed herein, the private key is an encrypted component. The certificate component does not include secret information and therefore it may be encrypted, or in some embodiments not encrypted. When the certificate is encrypted, it may be decrypted with the private key. The extracted RU private key is encrypted (at 342) and securely stored in the certificate store 210, along with the digital certificate. In this way, the BC 120 thus acts as an enhanced proxy or gateway that permits the RU 108 to request a digital certificate and private key from the OPS CA 220, but further acts to authenticate that RU digital certificate and private key request 330 from the RU 108 is authentic by generating and issuing the unique AuthToken for the RU 108.

In some embodiments, after the RU digital certificate and private key is installed at RU 108, the process may further proceed as shown in FIG. 3C. The RU 108 again sends an RU PKI status message 344 to the BC 120, this time informing the BC 120 that its RU digital certificate and private key are present. The RU 108 can now communicate directly with the DU VNF 105 using 5G protocols on the m-plane with the RU digital certificate and private key, and the BC 120 can send an RU digital certificate and private key status message 346 to the DMS 230 to inform the DMS 230 that the RU 108 is ready to bring 5G carrier operation into service.

Figure 4A:
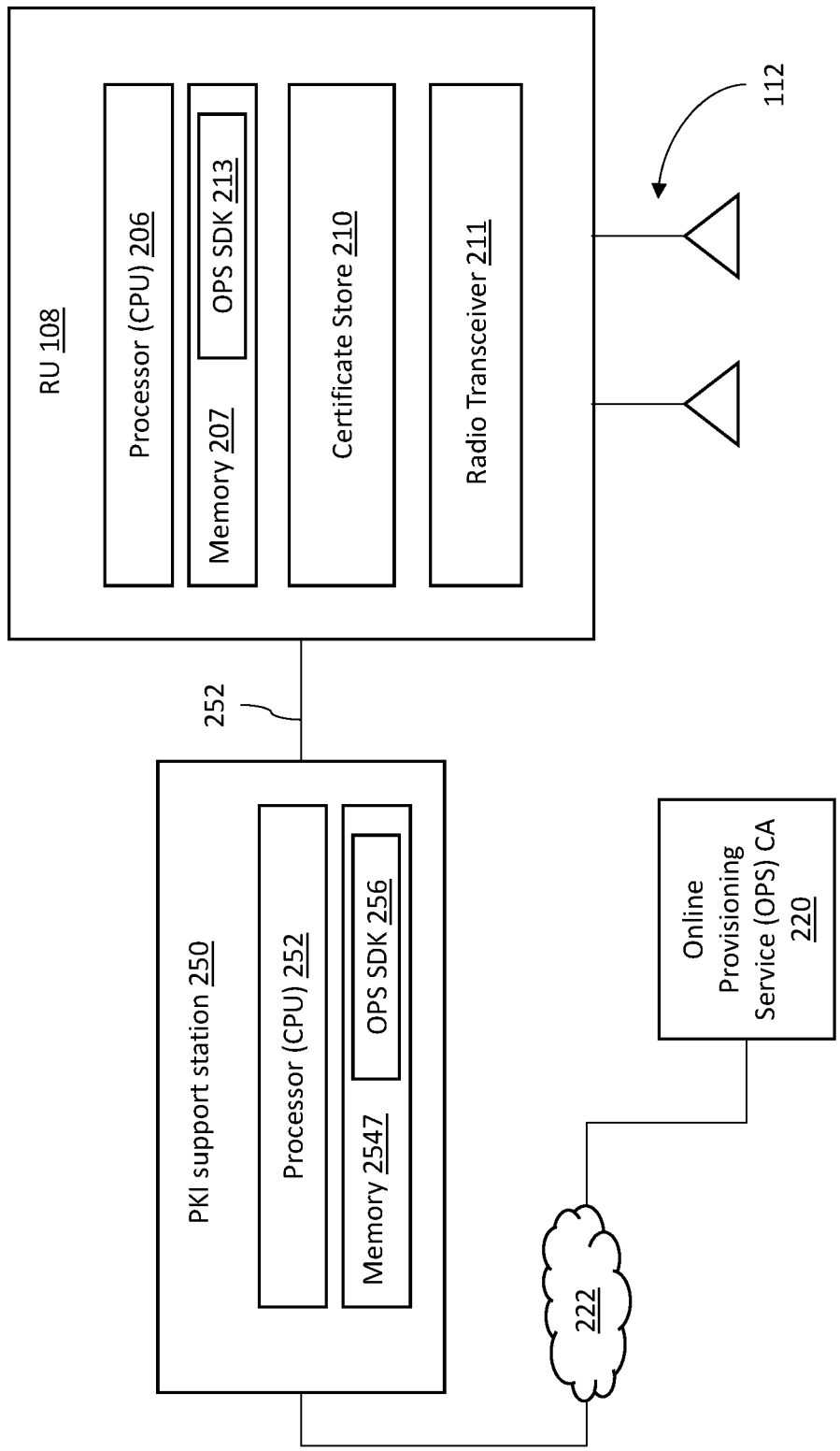
FIG. 4A is a diagram illustrating a PKI support station for digital certificate and private key allocations for a wireless base station radio unit prior to deployment.

FIGS. 4 and 4A illustrates a process sequence for the approach illustrated in FIG. 2A for a newly fabricated RU 108 that is not yet deployed but is instead going through setup, for example at a manufacturing facility. The issues faced in here with new RUs are very similar to those with field deployed RUs because a newly fabricated RU has no way to request from the OPS CA 220 its unique RU digital certificate and private key during the manufacturing process. In this embodiment, a PKI support station 250 is installed at the manufacturing facility of other facility where the RU 108 are setup prior to deployment.

At this point, the RU 108 already has installed the OPS SDK 213 that includes the code for establishing and operating M-plane communication with the DU VNF 105 utilizing the RU's digital certificate and private key (once received from the OPS CA 220) and is coupled to the PKI support station 250. The PKI support station 250, in essence, performs an equivalent function as the BC 120 with respect to assisting the RU 108 in obtaining its RU digital certificate and private key. As shown in FIG. 4A, PKI support station 250 comprises a processor 252 (i.e., a central processing unit (CPU)) and a memory 254, which together store and execute code to realize aspects of the PKI support station 250 as discussed herein. The PKI support station 250 runs its own version of the OPS SDK (shown at 256) and has a hardware certification and signing key issued by the OPS CA 220. The PKI support station 250 has access to the network 222 to communicate with the OPS CA 220 in order to obtain an RU digital certificate and private key for the RU 108, and optionally call on other services to perform diagnostics on the RU 108 and/or install other software.

Once the RU 108 is coupled to the PKI support station 250, the PKI support station 250 (at 420) generates a unique AuthToken for the RU 108. The AuthToken comprises a time stamp and the RU-MAC for the RU 108 and signs the AuthToken with its signing key. The signing key may be protected by a hardware security module such as a USB security token. When the RU 108 is configured to the point where it can receive its RU digital certificate and private key, the PKI support station 250 sends the AuthToken to the RU 108 in a trigger message 422.

RU 108 responds to the trigger message 422 by generating an RU digital certificate and private key request at 424. The request is generated using the AuthToken, a timestamp, its RU-MAC and its global key embedded in the OPS PKI 213. The AuthToken is signed with the global key and the RU 108 sends RU digital certificate and private key request message 426 to the PKI support station 250. The PKI support station 250 in turn forwards RU digital certificate and private key request message 428 to the OPS CA 220 on behalf of the requesting RU 108. As such, the RU digital certificate and private key request again originates from the entity that will use the RU digital certificate and private key.

The OPS CA 220 validates the RU digital certificate and private key request at 440 and generates the RU digital certificate and private key for the requesting RU 108, which is communicated back to the PKI support station 250 by RU digital certificate and private key response message 442. The PKI support station 250 forwards the RU digital certificate and private key to the RU 108 in RU digital certificate and private key response message 444. At the RU 108, the RU digital certificate and private key response message 444 is verified (shown at 446), and the private key decrypted by the OPS SDK 213. The extracted RU private key is encrypted (at 448) and securely stored in the certificate store 210, along with the digital certificate. When the RU 108 boots up after deployment, it will recognize that it already has its RU digital certificate and private key and will initiate communications with the DU VNF 105.

In this way, the BC 120 thus acts as an enhanced proxy or gateway that permits the RU 108 to request a digital certificate and private key from the OPS CA 220, but further acts to authenticate that RU digital certificate and private key request 330 from the RU 108 is authentic by generating and issuing the unique AuthToken for the RU 108.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a method for a remote unit (RU) of a wireless base station for obtaining PKI credentials, the method comprising: sending a PKI status message to a controller of the base station, wherein the PKI status message indicates that an RU digital certificate and private key are missing from a certificate store of the remote unit; receiving an AuthToken from the controller, wherein the AuthToken comprises a time stamp and a media access control (MAC) address for the remote unit and wherein the AuthToken is signed using a signing key by the controller; generating an RU digital certificate and private key request message by signing the AuthToken with a global key; transmitting the RU digital certificate and private key request message to the controller for forwarding to an online provision service (OPS) certificate authority (CA); receiving an RU digital certificate and private key response message from the controller, the RU digital certificate and private key response message comprising an RU digital certificate and private key from the OPS CA; decrypting the private key from the RU digital certificate and private key response message and storing the RU digital certificate and private key in the certificate store.

Example 2 includes the method of Example 1, further comprising: establishing communications between the remote unit and the controller via a management plane of the wireless base station, with the RU digital certificate and private key.

Example 3 includes the method of any of Examples 1-2, further comprising: querying the certificate store to determine if the RU digital certificate and private key are missing, and sending the PKI status message based on a result of the querying.

Example 4 includes the method of any of Examples 1-3, wherein the controller is a baseband controller comprises one or more virtualized entities, wherein the one or more virtualized entities comprise: a central unit control-plane (CU-CP) virtual network function (VNF); a central unit user-plane (CU-UP) VNF; and at lead one distribution node (DU) VNF.

Example 5 includes the method of any of Examples 3-4, further comprising: establishing communications with the DU VNF via a management plane with the RU digital certificate and private key.

Example 6 includes the method of any of Examples 1-5, wherein the remote unit comprises a multiple carrier remote unit comprising a combination of 4G LTE and 5G carriers.

Example 7 includes the method of any of Examples 1-6, wherein remote unit is configured to implement a radio frequency (RF) interface and is deployed in a physical location where radio coverage is to be provided.

Example 8 includes a method for a wireless base station for obtaining PKI credentials for a remote unit of the wireless base station, the method comprising: receiving a PKI status message at a controller of the base station, wherein the PKI status message indicates that an RU digital certificate and private key are missing from a certificate store of a remote unit; sending an enable request message to a device management system (DMS) for the wireless base station, the enable request message identifying the remote unit as missing the RU digital certificate and private key; receiving an enable response message from the DMS, the enable response message indicated whether the remote is authorized to receive an RU digital certificate and private key; when the remote is authorized to receive an RU digital certificate and private key, generating and sending to the remote unit an AuthToken comprising a time stamp and a media access control (MAC) address for the remote unit, wherein the AuthToken is signed with a signing key of controller; receiving an RU digital certificate and private key request message from the remote unit, the RU digital certificate and private key request message comprising the AuthToken and signed by the remote unit with a global key; forwarding the RU digital certificate and private key request message to an online providing service (OPS) certificate authority (CA) for the wireless base station; and forwarding an RU digital certificate and private key response message from the OPS CA to the remote unit.

Example 9 includes the method of Example 8, further comprising: receiving a second PKI status message at the controller of the base station, wherein the PKI status message indicates that the RU digital certificate and private key are present in the certificate store of the remote unit; sending a status message to the DMS 230 that the RU a carrier using the RU digital certificate and private key is ready for service.

Example 10 includes the method of any of Examples 8-9, wherein the controller is a baseband controller comprises one or more virtualized entities, wherein the one or more virtualized entities comprise: a central unit control-plane (CU-CP) virtual network function (VNF); a central unit user-plane (CU-UP) VNF; and at lead one distribution node (DU) VNF.

Example 11 includes the method of Example 10, further comprising: establishing communications between the DU VNF and the remote unit via a management plane with the RU digital certificate and private key.

Example 12 includes the method of any of Examples 8-11, wherein the remote unit comprises a multiple carrier remote unit comprising a combination of 4G LTE and 5G carriers.

Example 13 includes the method of any of Examples 8-12, wherein remote unit is configured to implement a radio frequency (RF) interface and is deployed in a physical location where radio coverage is to be provided.

Example 14 includes a method for a remote unit (RU) for a wireless base station for obtaining PKI credentials, the method comprising: coupling a remote unit for a wireless base station to a PKI support station, wherein the remote unit comprises a certificate store that is missing an RU digital certificate and private key for the remote unit; receiving a trigger message from the PKI support station, the trigger message comprising an AuthToken that comprises a time stamp and a media access control (MAC) address for the remote unit and wherein the AuthToken is signed using a signing key by the PKI support station; generating an RU digital certificate and private key request message by signing the AuthToken with a global key; transmitting the RU digital certificate and private key request message to the PKI support station for forwarding to an online provision service (OPS) certificate authority (CA); receiving an RU digital certificate and private key response message from the PKI support station, the RU digital certificate and private key response message comprising an RU digital certificate and private key from the OPS CA; decrypting the private key from the RU digital certificate and private key response message and storing the RU digital certificate and private key in the certificate store.

Example 15 includes the method of Example 14, wherein the remote unit comprises a multiple carrier remote unit comprising a combination of 4G LTE and 5G carriers.

Example 16 includes the method of any of Examples 14-15, wherein remote unit is configured to implement a radio frequency (RF) interface to provide radio coverage to a coverage area at a physical location.

Example 17 includes a method for obtaining PKI credentials for a remote unit for a wireless base station utilizing a PKI support station, the method comprising: coupling a remote unit for a wireless base station to THE PKI support station, wherein the remote unit comprises a certificate store that is missing an RU digital certificate and private key for the remote unit; sending a trigger message from the PKI support station to the remote unit, the trigger message comprising an AuthToken that comprises a time stamp and a media access control (MAC) address for the remote unit and wherein the AuthToken is signed using a signing key by the PKI support station; receiving an RU digital certificate and private key request message from the remote unit, the RU digital certificate and private key request message comprising the AuthToken and signed by the remote unit with a global key; forwarding the RU digital certificate and private key request message to an online providing service (OPS) certificate authority (CA) for the wireless base station; and forwarding an RU digital certificate and private key response message from the OPS CA to the remote unit.

Example 18 includes the method of Example 17, wherein the remote unit comprises a multiple carrier remote unit comprising a combination of 4G LTE and 5G carriers.

Example 19 includes the method of any of Examples 17-18, wherein remote unit is configured to implement a radio frequency (RF) interface and is deployed in a physical location where radio coverage is to be provided.

Example 20 includes a system for obtaining PKI credentials for a remote unit for a wireless base station, the system comprising: a remote unit, the remote unit configured to implement a radio frequency (RF) interface; a gateway coupled to the remote unit, the gateway communicatively coupled to an online provision service (OPS) certificate authority (CA); wherein the gateway is configured to generate an AuthToken unique to the remote unit, wherein the remote unit is configured to request a RU digital certificate and private key from an OPS CA based on the AuthToken.

Example 21 includes the system of Example 20, wherein the AuthToken comprises a time stamp and a media access control (MAC) address for the remote unit and wherein the AuthToken is signed using a signing key by the gateway.

Example 22 includes the system of any of Examples 20-21, wherein the remote unit is configured to generate an RU digital certificate and private key request message by signing the AuthToken with a global key; and wherein the remote unit is configured to transmit the RU digital certificate and private key request message to the gateway for forwarding to the OPS CA.

Example 23 includes the system of any of Examples 20-22, wherein the remote unit is configured to receiving an RU digital certificate and private key response message from the gateway, the RU digital certificate and private key response message comprising the RU digital certificate and private key from the OPS CA; wherein the remote unit is configured to decrypt the private key from the RU digital certificate and private key response message and store the RU digital certificate and private key in a certificate store.

Example 24 includes the system of any of Examples 20-23, wherein the gateway comprises a PKI support station coupled to the OPS CA by a network.

Example 25 includes the system of any of Examples 20-24, wherein the gateway comprises a baseband controller of a wireless base station.

Example 26 includes the system of Example 25, wherein the baseband controller comprises one or more virtualized entities, wherein the one or more virtualized entities comprise: a central unit control-plane (CU-CP) virtual network function (VNF); a central unit user-plane (CU-UP) VNF; and at lead one distribution node (DU) VNF coupled to the remote unit.

Example 27 includes the system of any of Examples 20-26, wherein the remote unit comprises a multiple carrier remote unit comprising a combination of 4G LTE and 5G carriers.

In various alternative embodiments, system and/or device elements, method steps, or example implementations described throughout this disclosure (such as any of the Central Cloud, Edge Cloud, Certificate Authorities, Cloud Master Node, Cloud Worker Node, virtual network function, central unit control-plane (CU-CP) VNF, central unit user-plane (CU-CP) VNF, and distributed unit (DU) VNF, radio units, radio points, remote antenna units, base station, VNF hosting platform, baseband controllers, gateways, controllers, processor, memory, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, wireless base station related terms such as Central Cloud, Edge Cloud, Certificate Authorities, Cloud Master Node, Cloud Worker Node, virtual network function, central unit control-plane (CU-CP) VNF, central unit user-plane (CU-CP) VNF, and distributed unit (DU) VNF, radio units, radio points, remote antenna units, base station, VNF hosting platform, baseband controllers, gateways, controllers, processor, memory, or sub-parts thereof, refer to non-generic elements as would recognized and understood by those of skill in the art of telecommunications and networks and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for a remote unit (RU) of a wireless base station for obtaining PKI credentials, the method comprising:

sending a PKI status message to a controller of the base station, wherein the PKI status message indicates that an RU digital certificate and private key are missing from a certificate store of the remote unit;

receiving an AuthToken from the controller, wherein the AuthToken comprises a time stamp and a media access control (MAC) address for the remote unit and wherein the AuthToken is signed using a signing key by the controller;

generating an RU digital certificate and private key request message by signing the AuthToken with a global key;

transmitting the RU digital certificate and private key request message to the controller for forwarding to an online provision service (OPS) certificate authority (CA);

receiving an RU digital certificate and private key response message from the controller, the RU digital certificate and private key response message comprising an RU digital certificate and private key from the OPS CA; and decrypting the private key from the RU digital certificate and private key response message and storing the RU digital certificate and private key in the certificate store.

2. The method of claim 1, further comprising:
establishing communications between the remote unit and the controller via a management plane of the wireless base station, with the RU digital certificate and private key.

3. The method of claim 1, further comprising:
querying the certificate store to determine if the RU digital certificate and private key are missing, and sending the PKI status message based on a result of the querying.

4. The method of claim 1, wherein the controller is a baseband controller comprises one or more virtualized entities, wherein the one or more virtualized entities comprise:
a central unit control-plane (CU-CP) virtual network function (VNF);
a central unit user-plane (CU-UP) VNF; and
at lead one distribution node (DU) VNF.

5. The method of claim 3, further comprising:
establishing communications with a DU VNF via a management plane with the RU digital certificate and private key.

6. The method of claim 1, wherein the remote unit comprises a multiple carrier remote unit comprising a combination of 4G LTE and 5G carriers.

7. The method of claim 1, wherein remote unit is configured to implement a radio frequency (RF) interface and is deployed in a physical location where radio coverage is to be provided.

8. A method for a wireless base station for obtaining PKI credentials for a remote unit of the wireless base station, the method comprising:
receiving a PKI status message at a controller of the base station, wherein the PKI status message indicates that an RU digital certificate and private key are missing from a certificate store of a remote unit;
sending an enable request message to a device management system (DMS) for the wireless base station, the enable request message identifying the remote unit as missing the RU digital certificate and private key;
receiving an enable response message from the DMS, the enable response message indicated whether the remote is authorized to receive an RU digital certificate and private key;
when the remote is authorized to receive an RU digital certificate and private key, generating and sending to the remote unit an AuthToken comprising a time stamp and a media access control (MAC) address for the remote unit, wherein the AuthToken is signed with a signing key of controller;
receiving an RU digital certificate and private key request message from the remote unit, the RU digital certificate and private key request message comprising the AuthToken and signed by the remote unit with a global key;
forwarding the RU digital certificate and private key request message to an online providing service (OPS) certificate authority (CA) for the wireless base station; and
forwarding an RU digital certificate and private key response message from the OPS CA to the remote unit.

9. The method of claim 8, further comprising:
receiving a second PKI status message at the controller of the base station, wherein the PKI status message indicates that the RU digital certificate and private key are present in the certificate store of the remote unit; and sending a status message to the DMS 230 that the RU a carrier using the RU digital certificate and private key is ready for service.

10. The method of claim 8, wherein the controller is a baseband controller comprises one or more virtualized entities, wherein the one or more virtualized entities comprise:
a central unit control-plane (CU-CP) virtual network function (VNF);
a central unit user-plane (CU-UP) VNF; and
at lead one distribution node (DU) VNF.

11. The method of claim 10, further comprising:
establishing communications between the DU VNF and the remote unit via a management plane with the RU digital certificate and private key.

12. The method of claim 8, wherein the remote unit comprises a multiple carrier remote unit comprising a combination of 4G LTE and 5G carriers.

13. The method of claim 8, wherein remote unit is configured to implement a radio frequency (RF) interface and is deployed in a physical location where radio coverage is to be provided.

14. A method for a remote unit (RU) for a wireless base station for obtaining PKI credentials, the method comprising:
coupling a remote unit for a wireless base station to a PKI support station, wherein the remote unit comprises a certificate store that is missing an RU digital certificate and private key for the remote unit;
receiving a trigger message from the PKI support station, the trigger message comprising an AuthToken that comprises a time stamp and a media access control (MAC) address for the remote unit and wherein the AuthToken is signed using a signing key by the PKI support station;
generating an RU digital certificate and private key request message by signing the AuthToken with a global key;
transmitting the RU digital certificate and private key request message to the PKI support station for forwarding to an online provision service (OPS) certificate authority (CA);
receiving an RU digital certificate and private key response message from the PKI support station, the RU digital certificate and private key response message comprising an RU digital certificate and private key from the OPS CA; and
decrypting the private key from the RU digital certificate and private key response message and storing the RU digital certificate and private key in the certificate store.

15. The method of claim 14, wherein the remote unit comprises a multiple carrier remote unit comprising a combination of 4G LTE and 5G carriers.

16. The method of claim 14, wherein remote unit is configured to implement a radio frequency (RF) interface to provide radio coverage to a coverage area at a physical location.

17. A method for obtaining PKI credentials for a remote unit for a wireless base station utilizing a PKI support station, the method comprising:
coupling a remote unit for a wireless base station to the PKI support station, wherein the remote unit comprises a certificate store that is missing an RU digital certificate and private key for the remote unit;
sending a trigger message from the PKI support station to the remote unit, the trigger message comprising an AuthToken that comprises a time stamp and a media access control (MAC) address for the remote unit and wherein the AuthToken is signed using a signing key by the PKI support station;

receiving an RU digital certificate and private key request message from the remote unit, the RU digital certificate and private key request message comprising the AuthToken and signed by the remote unit with a global key;

forwarding the RU digital certificate and private key request message to an online providing service (OPS) certificate authority (CA) for the wireless base station; and forwarding an RU digital certificate and private key response message from the OPS CA to the remote unit.

18. The method of claim 17, wherein the remote unit comprises a multiple carrier remote unit comprising a combination of 4G LTE and 5G carriers.

19. The method of claim 17, wherein remote unit is configured to implement a radio frequency (RF) interface and is deployed in a physical location where radio coverage is to be provided.

20. A system for obtaining PKI credentials for a remote unit for a wireless base station, the system comprising:

a remote unit, the remote unit configured to implement a radio frequency (RF) interface; and a gateway coupled to the remote unit, the gateway communicatively coupled to an online provision service (OPS) certificate authority (CA);

wherein the gateway is configured to generate an AuthToken unique to the remote unit, wherein the remote unit is configured to request a RU digital certificate and private key from an OPS CA based on the AuthToken.

21. The system of claim 20, wherein the AuthToken comprises a time stamp and a media access control (MAC) address for the remote unit and wherein the AuthToken is signed using a signing key by the gateway.

22. The system of claim 20, wherein the remote unit is configured to generate an RU digital certificate and private key request message by signing the AuthToken with a global key;

wherein the remote unit is configured to transmit the RU digital certificate and private key request message to the gateway for forwarding to the OPS CA.

23. The system of claim 20, wherein the remote unit is configured to receiving an RU digital certificate and private key response message from the gateway, the RU digital certificate and private key response message comprising the RU digital certificate and private key from the OPS CA;

wherein the remote unit is configured to decrypt the private key from the RU digital certificate and private key response message and store the RU digital certificate and private key in a certificate store.

24. The system of claim 20, wherein the gateway comprises a PKI support station coupled to the OPS CA by a network.

25. The system of claim 20, wherein the gateway comprises a baseband controller of a wireless base station.

26. The system of claim 25, wherein the baseband controller comprises one or more virtualized entities, wherein the one or more virtualized entities comprise:

a central unit control-plane (CU-CP) virtual network function (VNF);

a central unit user-plane (CU-UP) VNF; and at lead one distribution node (DU) VNF coupled to the remote unit.

27. The system of claim 20, wherein the remote unit comprises a multiple carrier remote unit comprising a combination of 4G LTE and 5G carriers.

* * * * *